United States Patent
Bauder et al.

(10) Patent No.: US 7,656,251 B1
(45) Date of Patent: Feb. 2, 2010

(54) SPLIT BAND DUPLEXER

(75) Inventors: Ruediger Bauder, Feldkirchen-Westerham (DE); Joshua J. Caron, Summerfield, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 216 days.

(21) Appl. No.: 11/774,936

(22) Filed: Jul. 9, 2007

(51) Int. Cl.
*H03H 9/46* (2006.01)
*H03H 9/64* (2006.01)
*H01P 1/10* (2006.01)
*H04B 1/44* (2006.01)

(52) U.S. Cl. .................. 333/133; 333/101; 333/185
(58) Field of Classification Search .......... 333/133, 333/101, 132, 185; 455/78, 82
See application file for complete search history.

(56) References Cited

U.S. PATENT DOCUMENTS

| | | | | |
|---|---|---|---|---|
| 5,768,691 A | * | 6/1998 | Matero et al. ............... | 455/78 |
| 6,380,823 B1 | * | 4/2002 | Ikata et al. ................. | 333/133 |
| 7,187,945 B2 | * | 3/2007 | Ranta et al. ............... | 455/552.1 |
| 7,251,499 B2 | * | 7/2007 | Ella et al. ................. | 455/552.1 |
| 7,383,024 B2 | * | 6/2008 | Mueller et al. ............. | 455/78 |
| 7,383,032 B2 | * | 6/2008 | Frank et al. ............... | 455/183.2 |
| 7,570,622 B2 | * | 8/2009 | Totsuka et al. ............. | 370/337 |
| 2008/0205548 A1 | * | 8/2008 | Rofougaran ................ | 375/297 |

* cited by examiner

*Primary Examiner*—Dean O Takaoka
(74) *Attorney, Agent, or Firm*—Withrow & Terranova, P.L.L.C.

(57) ABSTRACT

The present invention is a split band duplexer, which increases the separation between a transmit passband and a receive passband by splitting the transmit and receive passbands into sub-bands. Each sub-band has a bandwidth that is less than the bandwidth of the full passband. The increased separation increases isolation margins and insertion loss margins, which allows use of standard filter components, such as surface acoustic wave (SAW) filters, and their accompanying manufacturing tolerances and drift characteristics. In one embodiment of the present invention, the split band duplexer includes a first sub-band duplexer and a second sub-band duplexer. The first sub-band duplexer may provide a full bandwidth transmit passband and a receive passband that is less than full bandwidth. The second sub-band duplexer may provide a full bandwidth receive passband and a transmit passband that is less than full bandwidth.

24 Claims, 17 Drawing Sheets

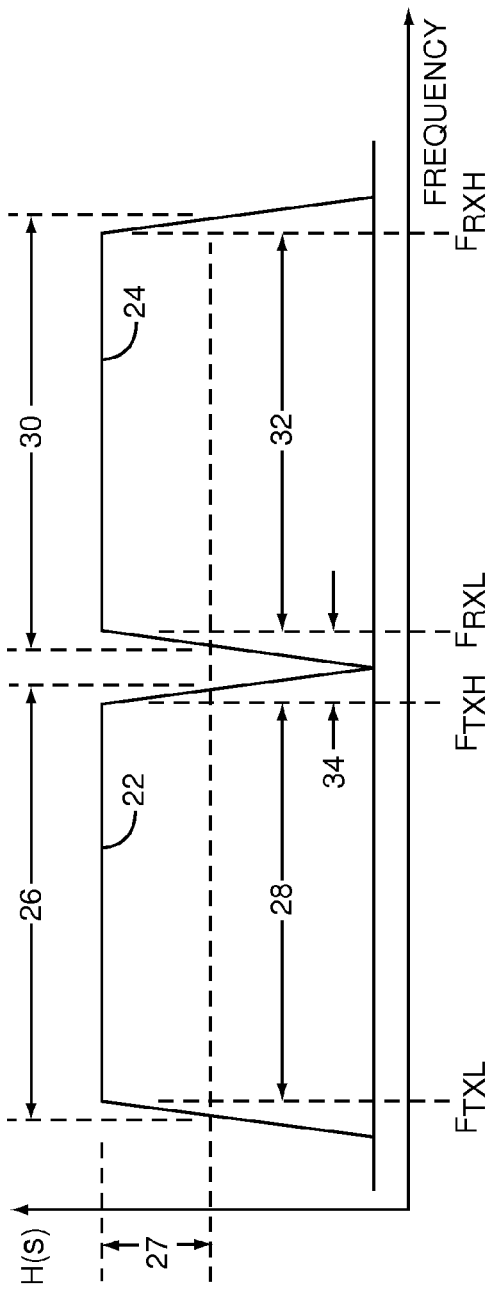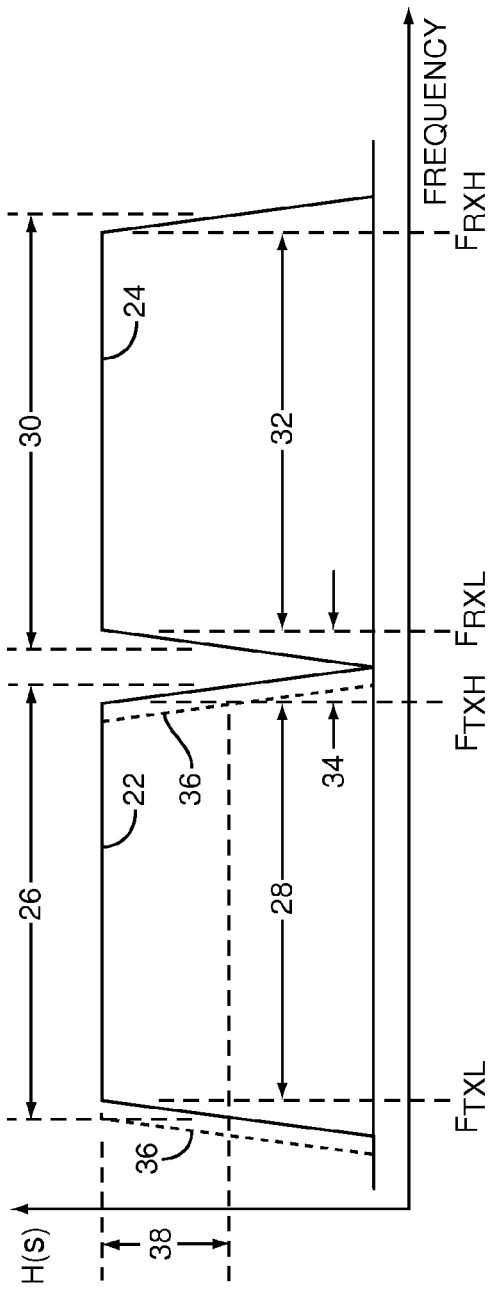

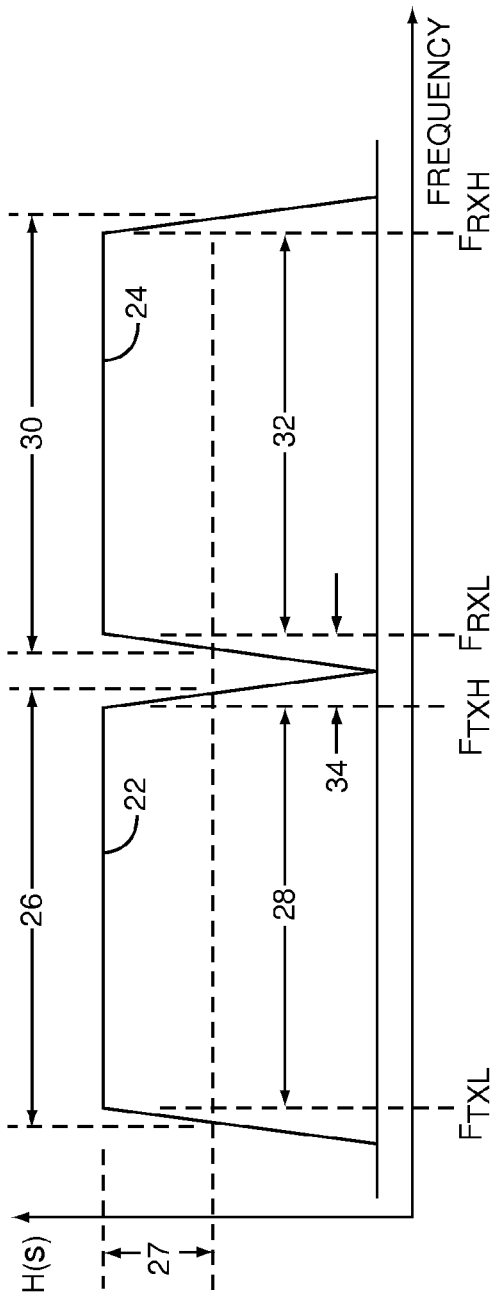
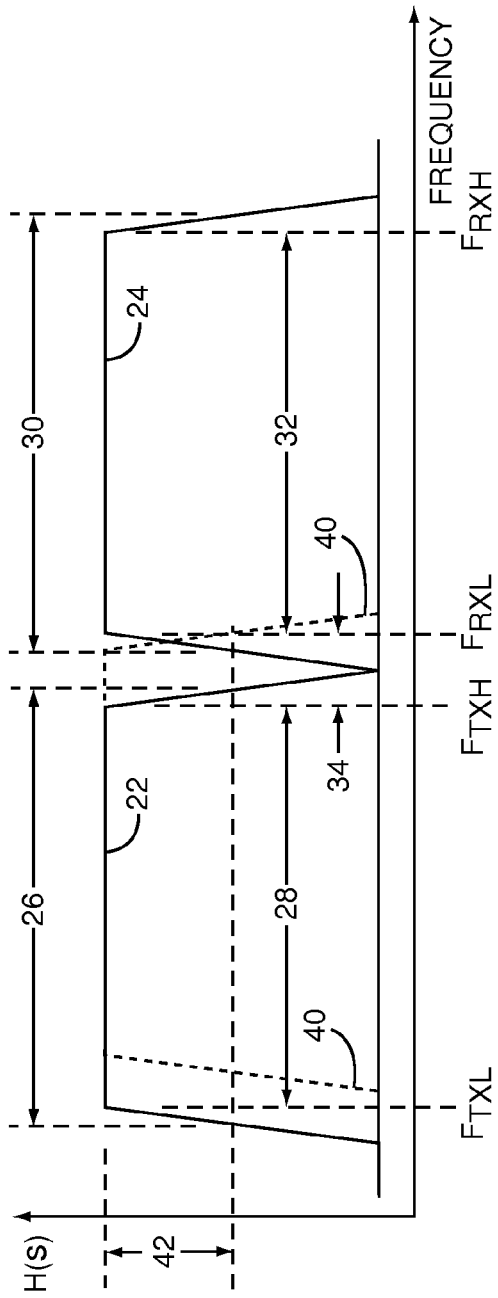

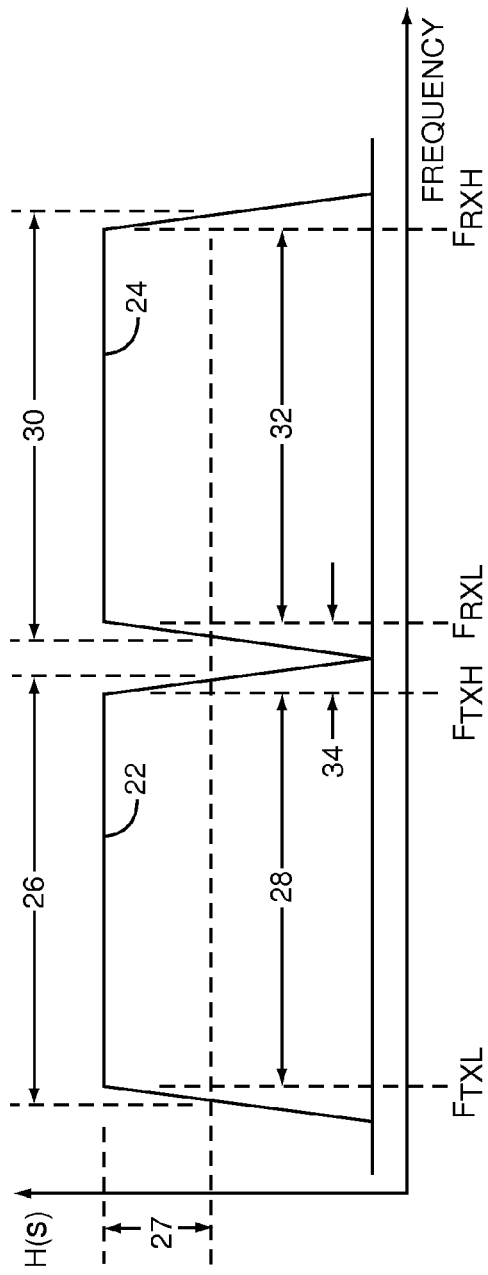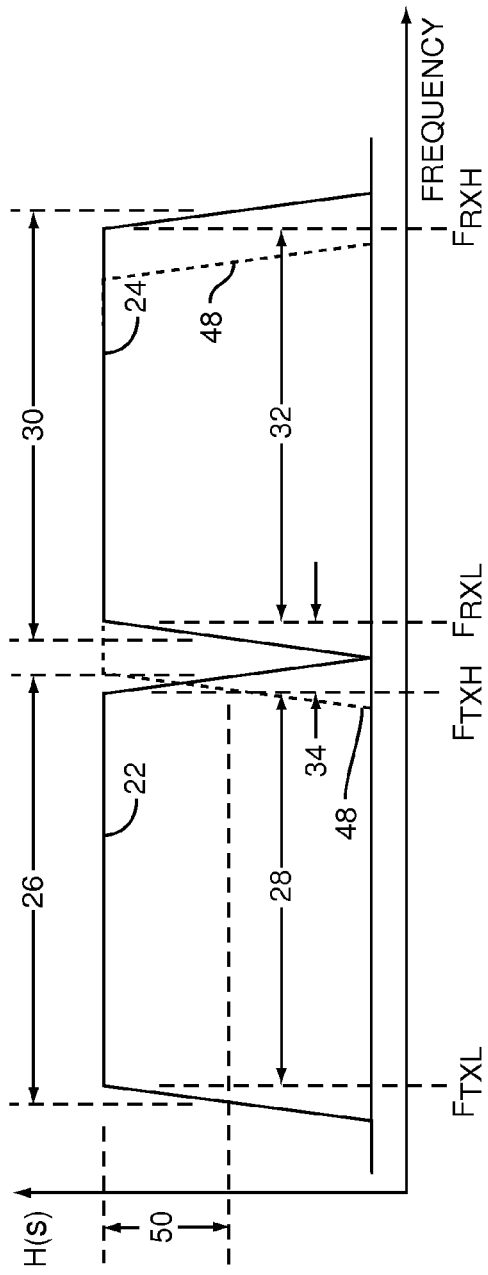

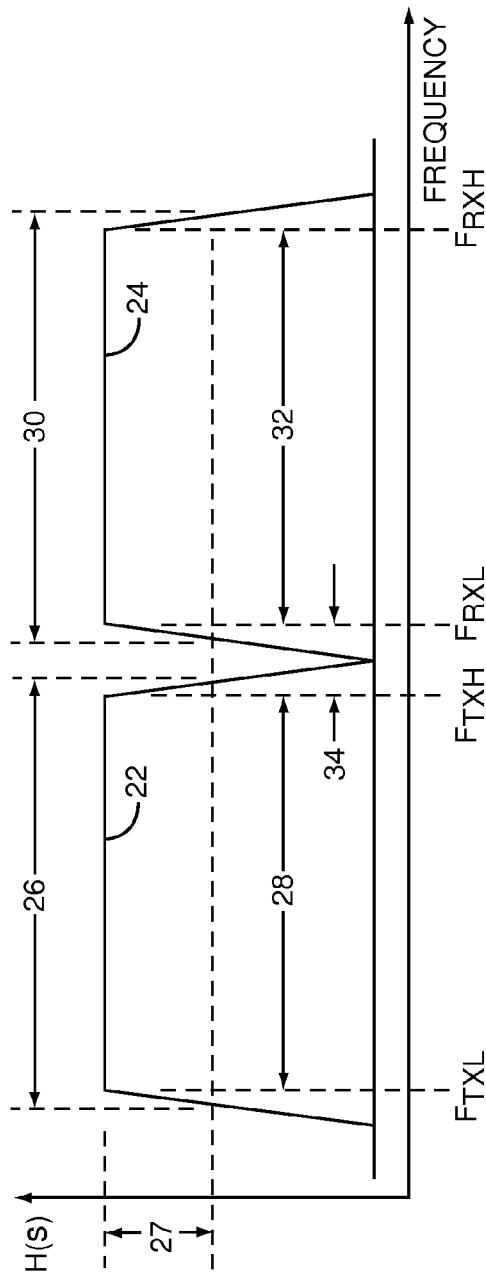
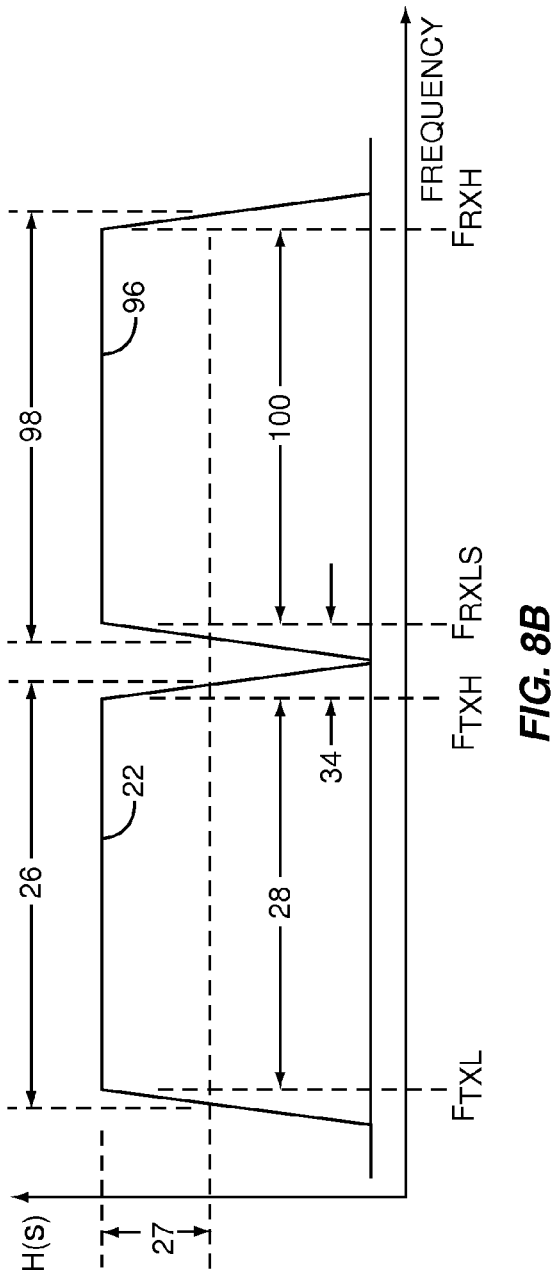
FIG. 8A
FIG. 8B

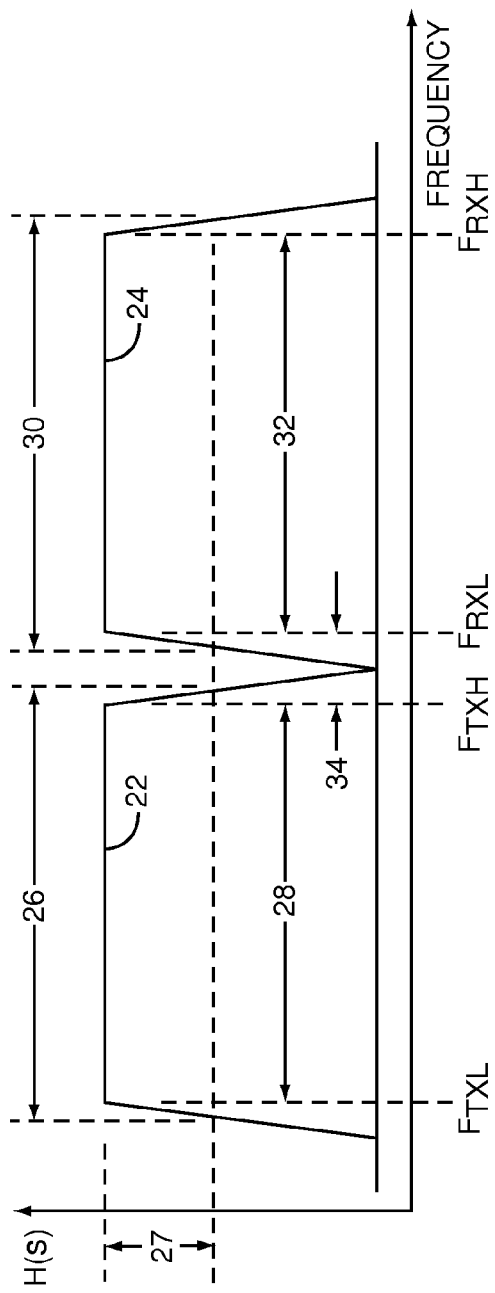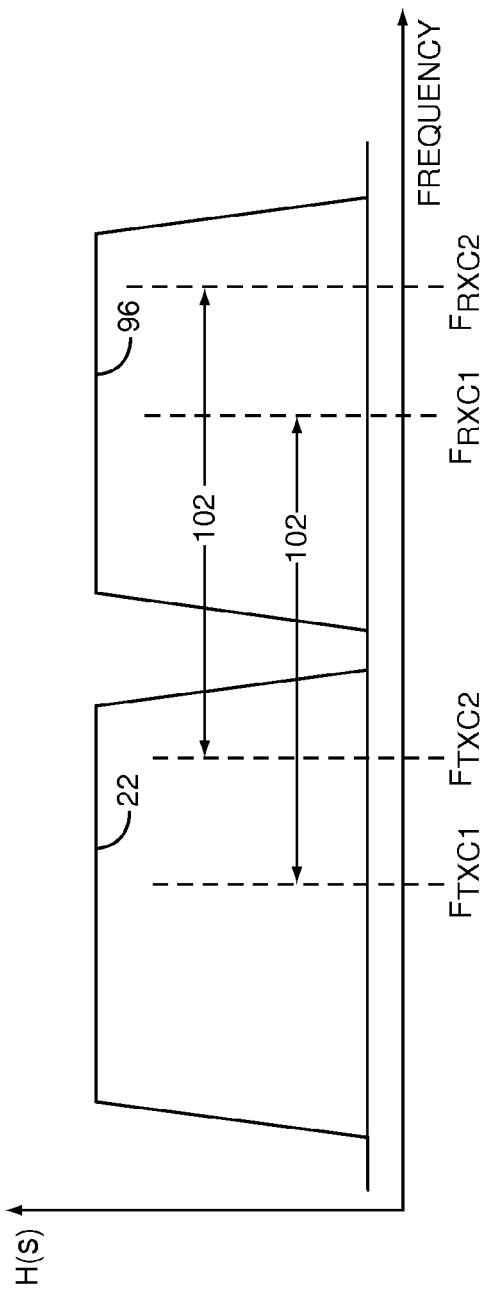

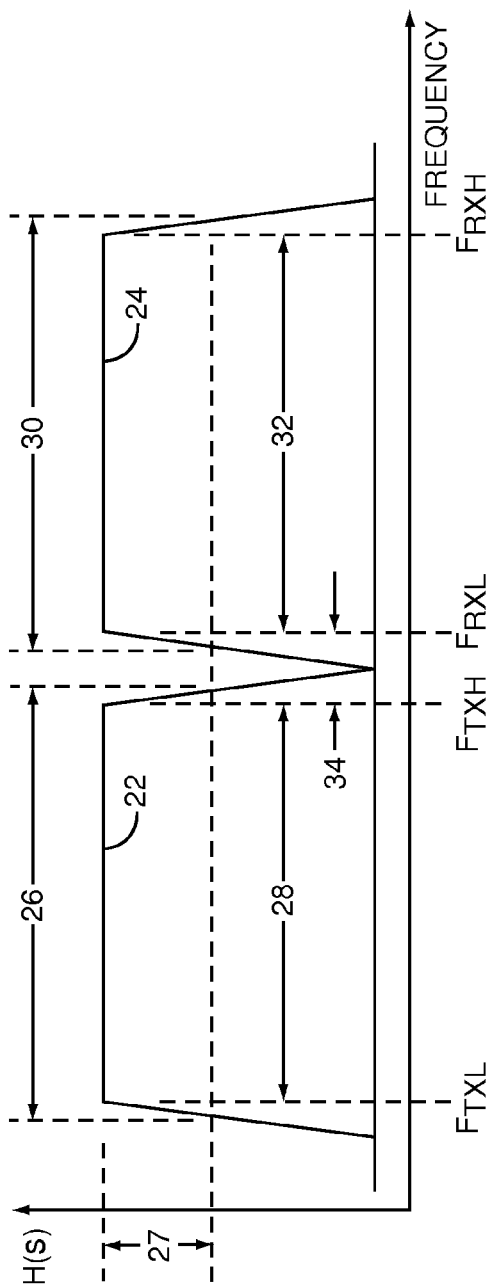
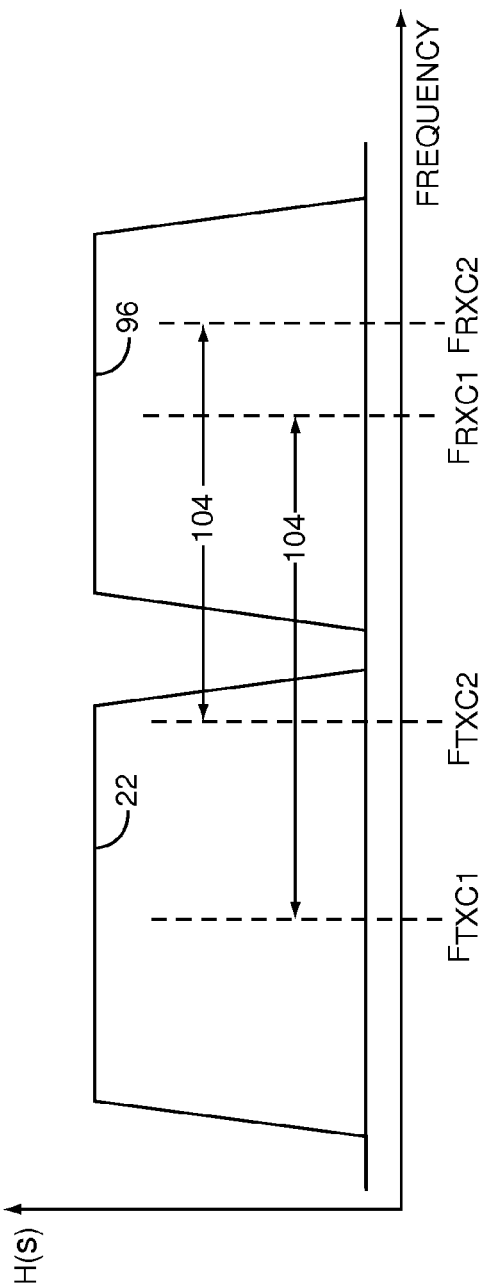
FIG. 10A
FIG. 10B

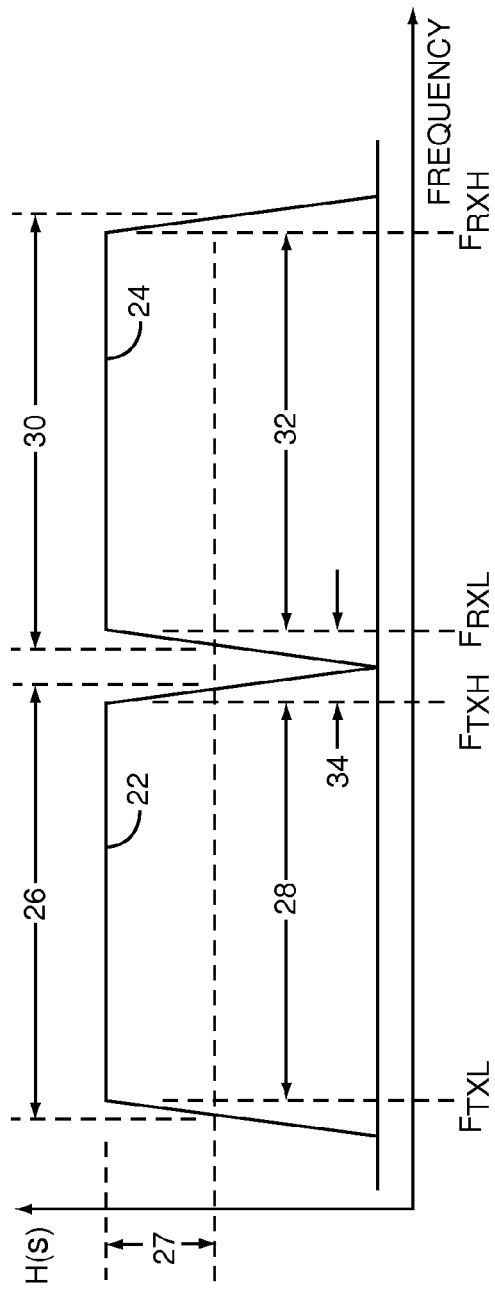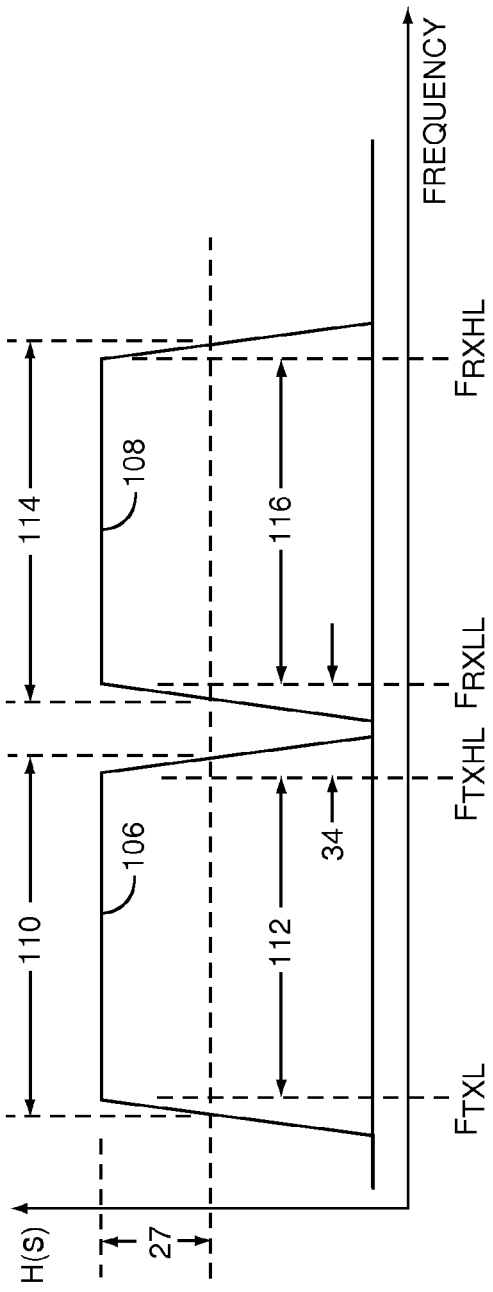

SPLIT BAND DUPLEXER

FIELD OF THE INVENTION

The present invention relates to radio frequency (RF) duplexers used in RF communications circuitry.

BACKGROUND OF THE INVENTION

RF communications systems typically communicate using at least one of three different modes of operation. The first mode, called simplex, is a one-way mode of operation, in which a transmitter from one location transmits data to a receiver at another location. For example, a broadcast radio station transmits data one-way to radios. The second mode, called half duplex, is a two-way mode of operation, in which a first transceiver communicates with a second transceiver; however, only one transceiver transmits at a time. Therefore, the transmitter and receiver in a transceiver do not operate simultaneously. For example, certain telemetry systems operate in a send-then-wait-for-reply manner. The third mode, called full duplex, is a simultaneous two-way mode of operation, in which a first transceiver communicates with a second transceiver, and both transceivers may transmit simultaneously; therefore, the transmitter and receiver in a transceiver must be capable of operating simultaneously. In a full duplex transceiver, signals from the transmitter must not interfere with signals received by the receiver; therefore, transmitted signals are at transmit frequencies that are different from received signals, which are at receive frequencies. The difference between a transmit frequency and a receive frequency is called the duplex frequency. For example, certain cellular telephone systems operate using a full duplex mode of operation.

Full duplex transceivers using a single antenna often use a duplexer to couple the transmitter and receiver to the single antenna. A duplexer enables simultaneous transmission and reception of RF signals by providing a transmit passband that does not overlap with a receive passband, which prevents interference between transmit and receive signals. The non-overlapping area is also known as a guard band. Some communications protocols, such as specific Universal Mobile Telecommunications System (UMTS) bands have guard bands that are narrow relative to the transmit and receive passbands; therefore, providing the required transmit and receive passbands with minimal insertion loss while providing required isolation between transmit and receive signals may be difficult.

Thus, there is a need for a duplexer that provides required transmit and receive passbands with minimal insertion loss while providing required isolation between transmit and receive signals.

SUMMARY OF THE INVENTION

The present invention is a split band duplexer, which increases the separation between a transmit passband and a receive passband by splitting the transmit and receive passbands into sub-bands. Each sub-band has a bandwidth that is less than the bandwidth of the full passband. The increased separation increases isolation margins and insertion loss margins, which allows use of standard filter components, such as surface acoustic wave (SAW) filters, and their accompanying manufacturing tolerances and drift characteristics. In one embodiment of the present invention, the split band duplexer includes a first sub-band duplexer and a second sub-band duplexer. The first sub-band duplexer may provide a full bandwidth transmit passband and a receive passband that is less than full bandwidth. The second sub-band duplexer may provide a full bandwidth receive passband and a transmit passband that is less than full bandwidth. By using either the first sub-band duplexer or the second sub-band duplexer, the full bandwidths of both the transmit and receive passbands are provided.

In an alternate embodiment of the present invention, the split band duplexer includes a first sub-band duplexer and a second sub-band duplexer. The first sub-band duplexer may provide a transmit passband and a receive passband that are less than full bandwidths. Additionally, the second sub-band duplexer may provide a transmit passband and a receive passband that are less than full bandwidths. However, the transmit passbands of the first and second sub-band duplexers span the full transmit passband, and the receive passbands of the first and second sub-band duplexers span the full receive passband. The bandwidth of the transmit passband may be approximately equal to the bandwidth of the receive passband and the bandwidth of the second sub-band duplexer transmit passband may be approximately equal to the bandwidth of the second sub-band duplexer receive passband. Additional embodiments of the present invention may split the full transmit passband, the full receive passband, or both, into any combination or number of sub-bands.

The duplex frequency may be fixed, variable, or both. Each sub-band duplexer may have its own antenna, or multiple sub-band duplexers may share a common antenna. The sub-band duplexers may be switched to the common antenna using switching circuitry, which may include any combination of Micro-Electro-Mechanical Systems (MEMS) switches, complementary metal oxide semiconductor (CMOS) switches, p-type high electron mobility transistor (p-hemt) switches, silicon germanium (SiGe) switches, discrete mechanical switches, or the like. MEMS generally refers to the integration of mechanical elements, sensors, actuators, or electronics on a common semiconductor substrate. The transmit bandpass filter and the receive bandpass filter of each sub-band duplexer may have its own antenna. Individual antennas may provide spatial diversity. Each sub-band duplexer may feed its own low noise amplifier (LNA) for received signals. Each sub-band duplexer may receive transmit signals from its own power amplifier (PA). Alternatively, each sub-band duplexer may receive transmit signals switched from a common PA using switching circuitry, which may include MEMS switches. The full receive and transmit passbands may include Universal Mobile Telecommunications System (UMTS) bands, such as UMTS region 2 or region 3. UMTS is one of the third-generation (3G) mobile phone technologies.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2A and 2B are graphs comparing ideal transmit and receive bandpass filter response curves for an RF duplexer with a downward shifted transmit bandpass filter response curve.

FIGS. 3A and 3B are graphs comparing the ideal transmit and receive bandpass filter response curves for an RF duplexer with an upward shifted transmit bandpass filter response curve.

FIGS. 5A and 5B are graphs comparing the ideal transmit and receive bandpass filter response curves for an RF duplexer with a downward shifted receive bandpass filter response curve.

FIGS. 8A and 8B are graphs comparing the ideal transmit and receive bandpass filter response curves for an RF duplexer with a sub-band receive bandpass filter response curve.

FIG. 9A is a graph showing the ideal transmit and receive bandpass filter response curves for an RF duplexer as illustrated in FIG. 2A.

FIG. 9B is a graph showing a fixed duplex frequency.

FIG. 10A is a graph showing the ideal transmit and receive bandpass filter response curves for an RF duplexer as illustrated in FIG. 2A.

FIG. 10B is a graph showing a variable duplex frequency.

FIGS. 11A and 11B are graphs comparing the ideal transmit and receive bandpass filter response curves for an RF duplexer with a lower sub-band transmit bandpass filter response curve and a lower sub-band receive bandpass filter response curve.

Figure 6:
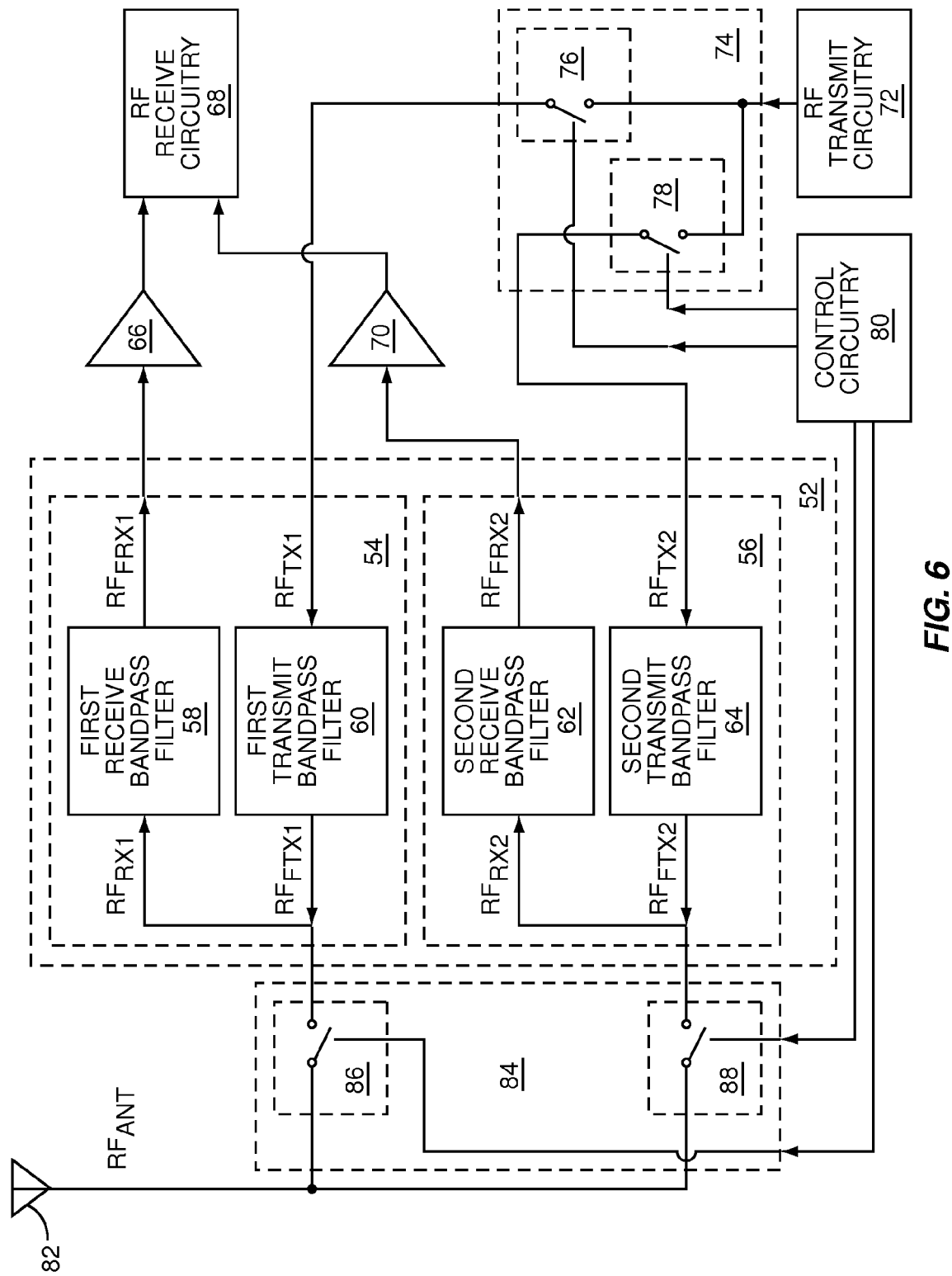
FIG. 6 shows a split band duplexer according to one embodiment of the present invention.
Figure 13:
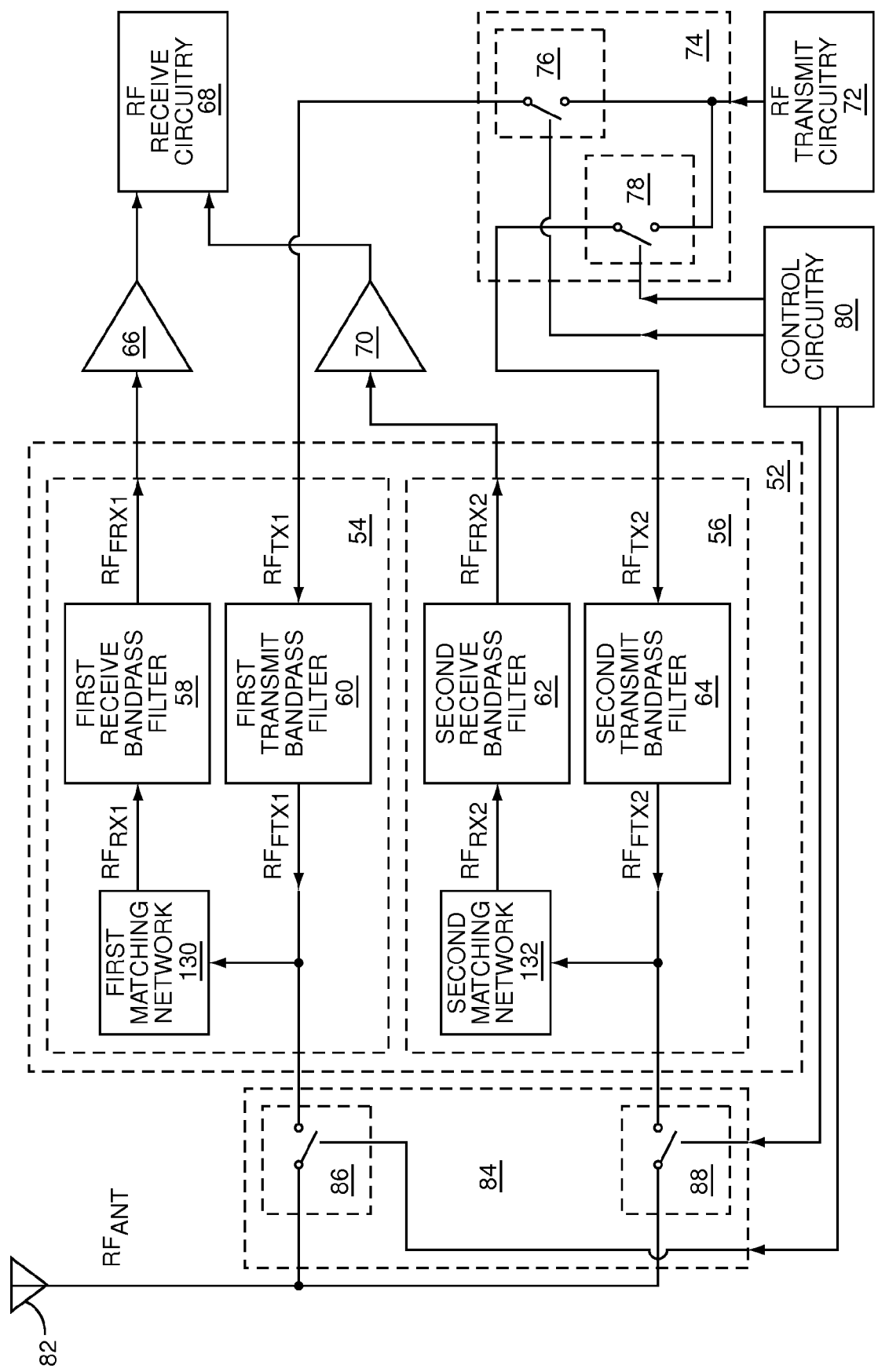

FIG. 13 adds first and second matching networks to the first and second sub-band duplexers, respectively, illustrated in FIG. 6.

Figure 14:
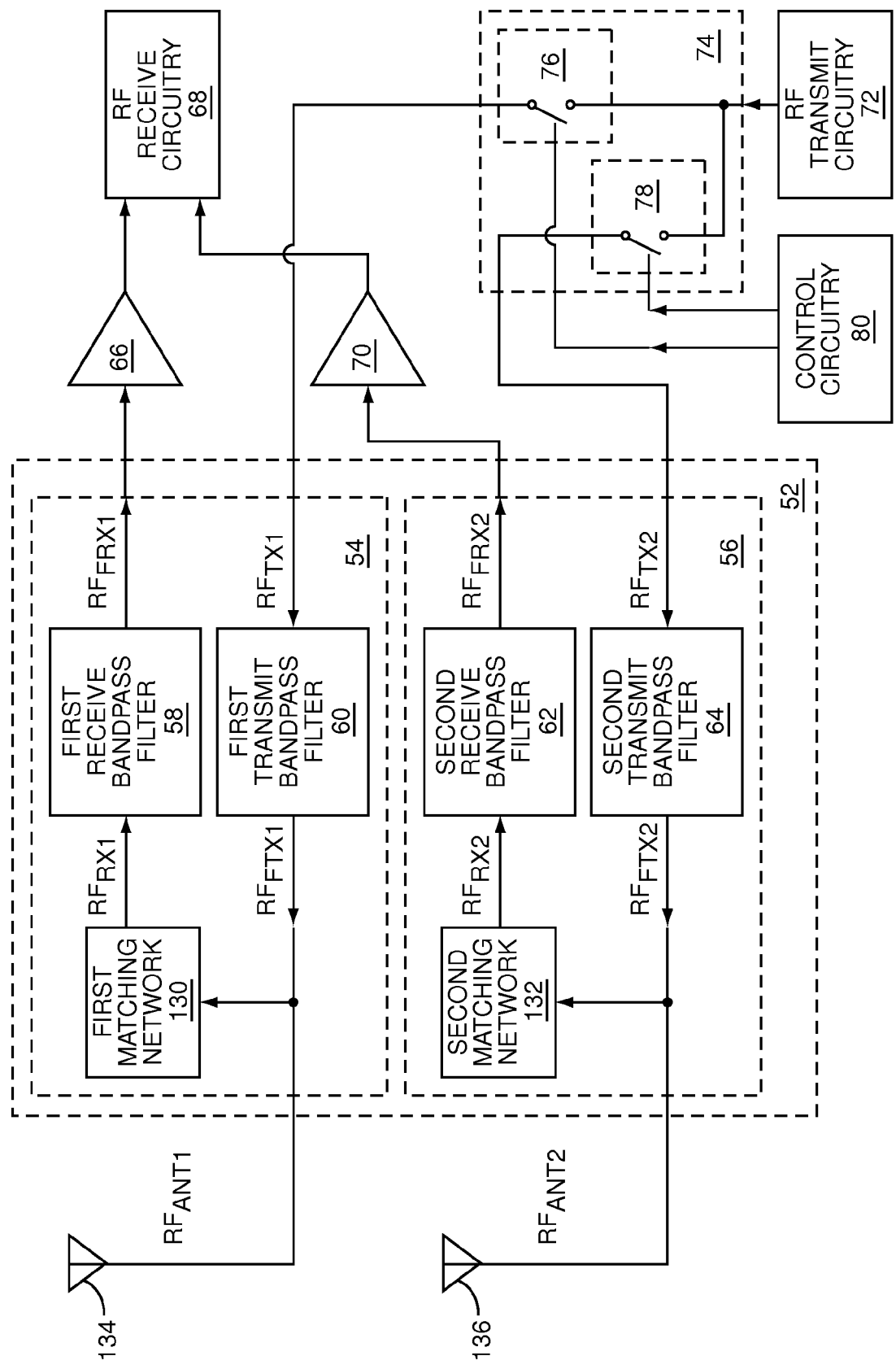

FIG. 14 shows the antenna and antenna switching circuitry illustrated in FIG. 6 replaced with a first and second antenna according to an alternate embodiment of the present invention.

Figure 15:
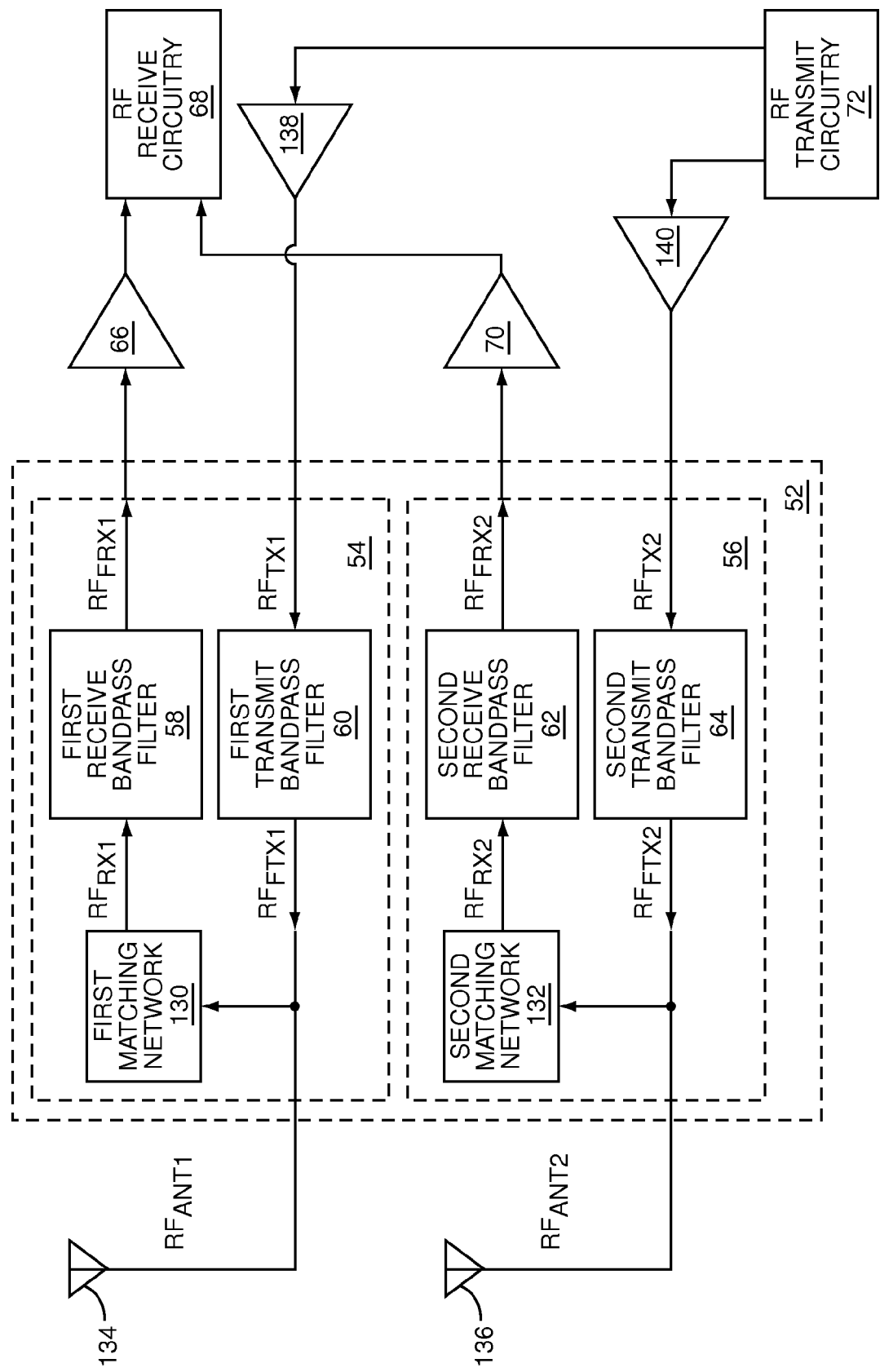

FIG. 15 shows the transmit switching circuitry illustrated in FIG. 14 replaced with a first and second power amplifier according to an additional embodiment of the present invention.

Figure 16:
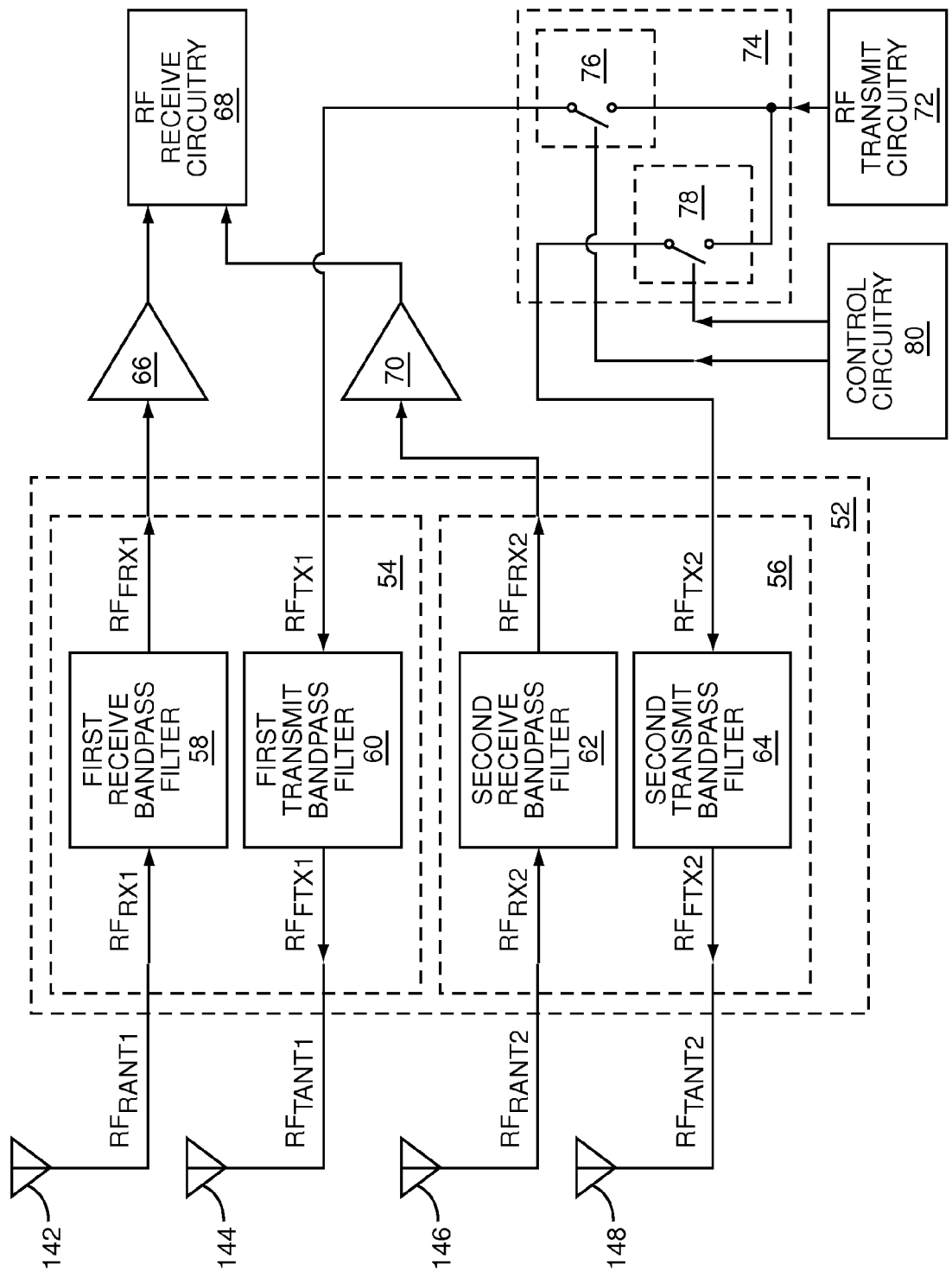

FIG. 16 shows the antenna and antenna switching circuitry illustrated in FIG. 6 replaced with a first receive antenna, a first transmit antenna, a second receive antenna, and a second transmit antenna, according to another embodiment of the present invention.

Figure 17:
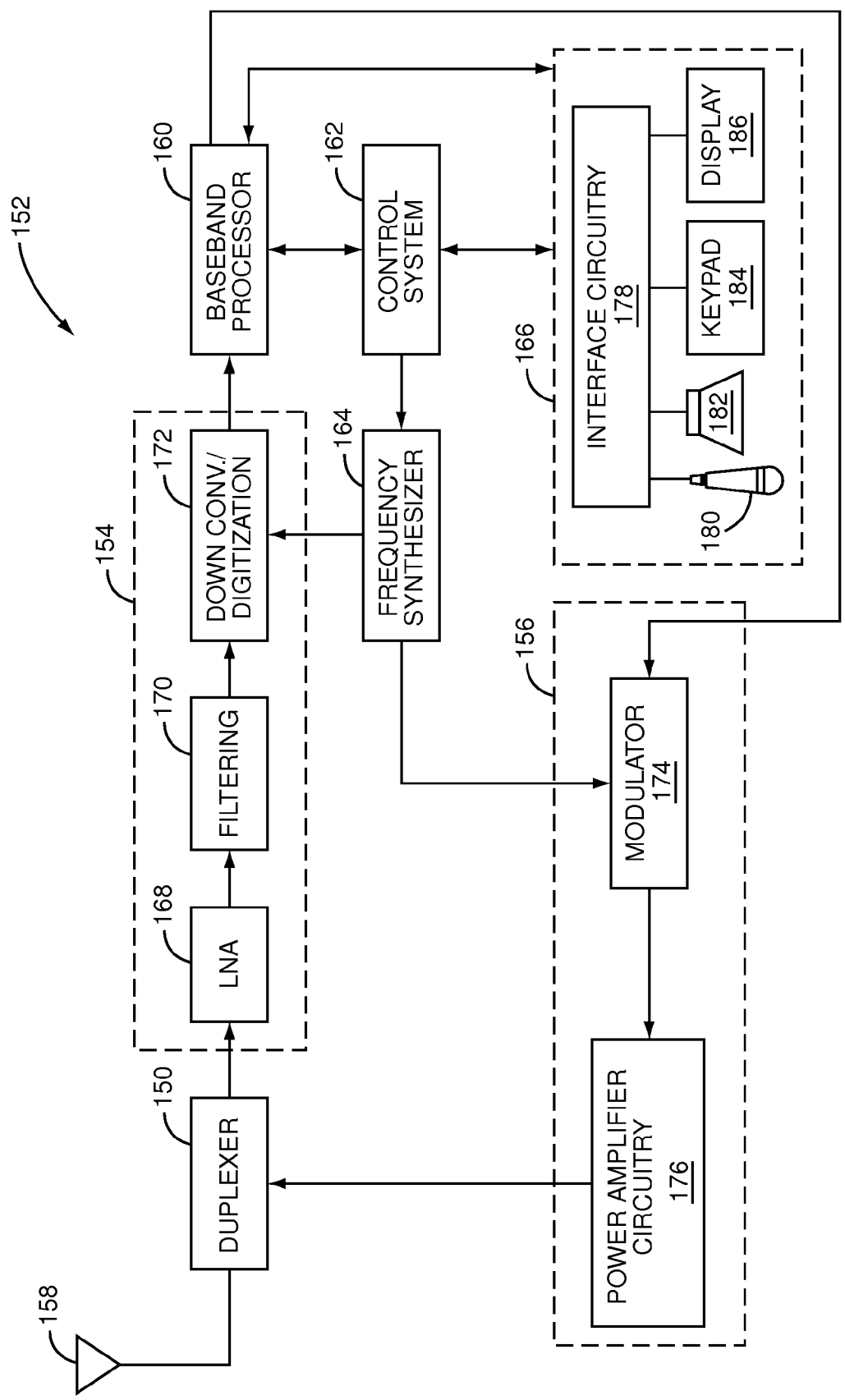

FIG. 17 shows an application example of the present invention used in a mobile terminal.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a split band duplexer, which increases the separation between a transmit passband and a receive passband by splitting the transmit and receive passbands into sub-bands. Each sub-band has a bandwidth that is less than the bandwidth of the full passband. The increased separation increases isolation margins and insertion loss margins, which allows use of standard filter components, such as surface acoustic wave (SAW) filters, and their accompanying manufacturing tolerances and drift characteristics. In one embodiment of the present invention, the split band duplexer includes a first sub-band duplexer and a second sub-band duplexer. The first sub-band duplexer may provide a full bandwidth transmit passband and a receive passband that is less than full bandwidth. The second sub-band duplexer may provide a full bandwidth receive passband and a transmit passband that is less than full bandwidth. By using either the first sub-band duplexer or the second sub-band duplexer, the full bandwidths of both the transmit and receive passbands are provided.

In an alternate embodiment of the present invention, the split band duplexer includes a first sub-band duplexer and a second sub-band duplexer. The first sub-band duplexer may provide a transmit passband and a receive passband that are less than full bandwidths. Additionally, the second sub-band duplexer may provide a transmit passband and a receive passband that are less than full bandwidths. However, the transmit passbands of the first and second sub-band duplexers span the full transmit passband, and the receive passbands of the first and second sub-band duplexers span the full receive passband. The bandwidth of the transmit passband may be approximately equal to the bandwidth of the receive passband and the bandwidth of the second sub-band duplexer transmit passband may be approximately equal to the bandwidth of the second sub-band duplexer receive passband. Additional embodiments of the present invention may split the full transmit passband, the full receive passband, or both, into any combination or number of sub-bands.

The duplex frequency may be fixed, variable, or both. Each sub-band duplexer may have its own antenna, or multiple sub-band duplexers may share a common antenna. The sub-band duplexers may be switched to the common antenna using switching circuitry, which may include Micro-Electro-Mechanical Systems (MEMS) switches. MEMS generally refers to the integration of mechanical elements, sensors, actuators, or electronics on a common semiconductor substrate. The transmit bandpass filter and the receive bandpass filter of each sub-band duplexer may have its own antenna. Individual antennas may provide spatial diversity. Each sub-band duplexer may feed its own low noise amplifier (LNA) for received signals. Each sub-band duplexer may receive transmit signals from its own power amplifier (PA). Alternatively, each sub-band duplexer may receive transmit signals switched from a common PA using switching circuitry, which may include MEMS switches. The full receive and transmit passbands may include Universal Mobile Telecommunications System (UMTS) bands, such as UMTS region 2 or region 3. UMTS is one of the third-generation (3G) mobile phone technologies.

Figure 1:
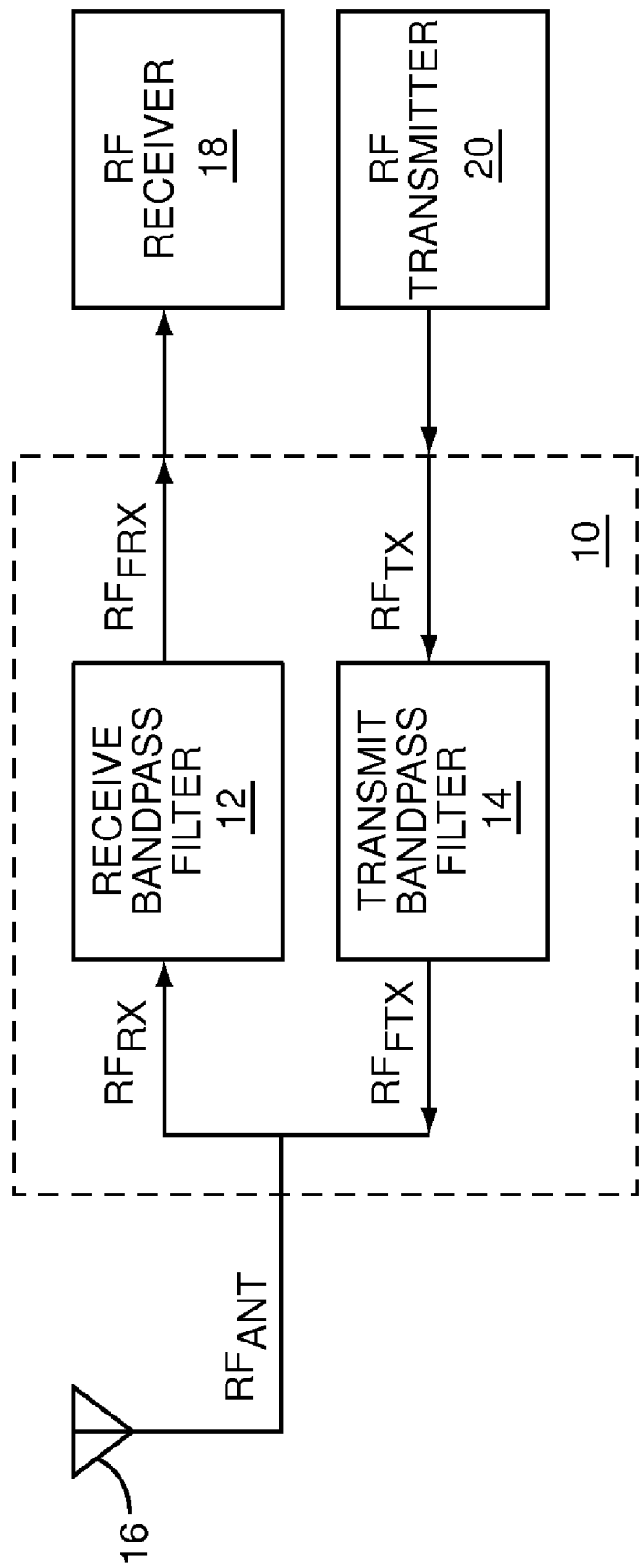
FIG. 1 shows an RF duplexer according to the prior art.

FIG. 1 shows an RF duplexer 10 according to the prior art. The RF duplexer 10 includes a receive bandpass filter 12 and a transmit bandpass filter 14, which are both coupled to an antenna 16. The antenna 16 has an antenna signal $RF_{ANT}$, which provides a receive signal $RF_{RX}$ to the receive bandbass filter 12, and receives a filtered transmit signal $RF_{FTX}$ from the transmit bandpass filter 14. The receive bandpass filter 12 provides a filtered receive signal $RF_{FRX}$ to an RF receiver 18, and the transmit bandpass filter 14 receives a transmit signal $RF_{TX}$ from an RF transmitter 20. Normally, the passband of the receive bandpass filter 12 does not overlap the passband of the transmit bandpass filter 14 to prevent noise from the transmit signal path or transmit signals from interfering with receiver operation.

FIG. 2A is a graph showing ideal transmit and receive bandpass filter response curves 22, 24 for an RF duplexer. The ideal transmit and receive bandpass filter response curves 22, 24 show the ideal transfer functions H(s) of the receive and transmit bandpass filters 12, 14 as a function of frequency. The ideal transmit bandpass filter response curve 22 has a full transmit bandpass filter bandwidth 26, which is measured at a filter breakpoint 27 below the maximum of the response curve 22. A full transmit passband 28 spans the transmit frequency ranges used by the RF duplexer 10. The ideal receive bandpass filter response curve 24 includes a full receive bandpass filter bandwidth 30, which is measured at the filter breakpoint 27 below the maximum of the response curve 24. A full receive passband 32 spans the receive frequency ranges used by the RF duplexer 10. A guard band 34 separates the full transmit passband 28 from the full receive passband 32, and provides isolation between transmit signals and RF signals. A lowest transmit passband frequency $F_{TXL}$ is at the bottom of the full transmit passband 28, and a highest transmit passband frequency $F_{TXH}$ is at the top of the full transmit passband 28. A lowest receive passband frequency $F_{RXL}$ is at the bottom of the full receive passband 32, and a highest receive passband frequency $F_{RXH}$ is at the top of the full receive passband 32. If the guard band 34 is small, then practical receive and transmit bandpass filters 12, 14 may vary from ideal bandpass filter responses sufficiently to impact filter operation. Such variances may be caused by multiple factors, including manufacturing tolerances, temperature drift, aging, other factors, or any combination thereof. FIG. 2B is a graph showing a downward shifted transmit bandpass filter response curve 36, which may be caused by any of the multiple factors listed above. At the highest transmit passband frequency $F_{TXH}$, the transmit bandpass filter 14 introduces additional insertion loss 38 into the transmit path, which may reduce output power, transmitter efficiency, or both.

FIG. 3A is a graph showing the ideal transmit and receive bandpass filter response curves 22, 24 for an RF duplexer as illustrated in FIG. 2A. FIG. 3B is a graph showing an upward shifted transmit bandpass filter response curve 40, which may be caused by manufacturing tolerances, temperature drift, aging, other factors, or any combination thereof. At the lowest receive passband frequency $F_{RXL}$, the transmit bandpass filter 14 has degraded transmit isolation 42, which may allow transmit noise to enter the receive path and desensitize the receiver.

Figure 4A:
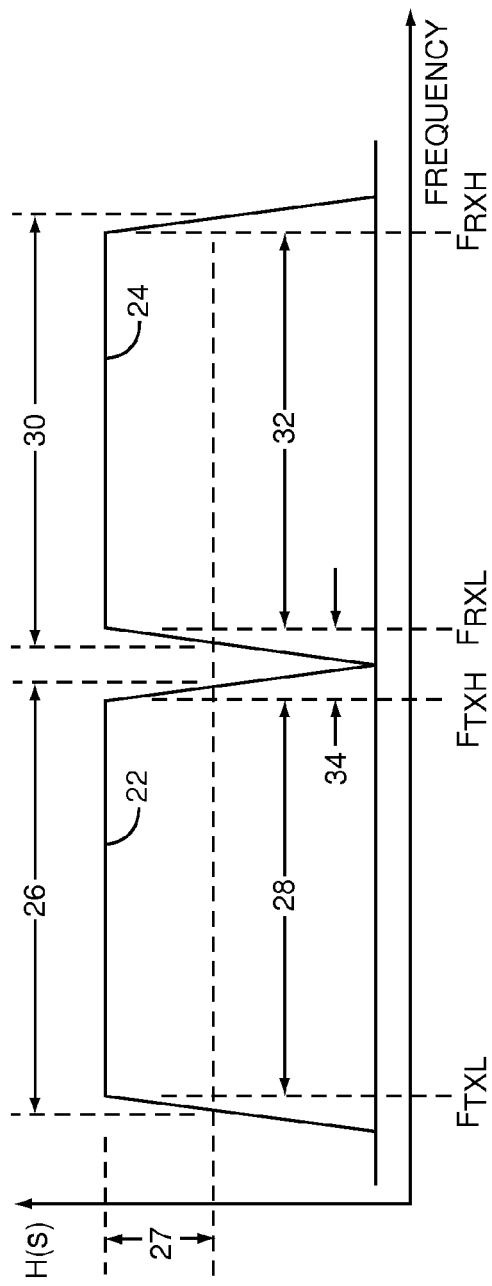
FIGS. 4A and 4B are graphs comparing the ideal transmit and receive bandpass filter response curves for an RF duplexer with an upward shifted receive bandpass filter response curve.
Figure 4B:
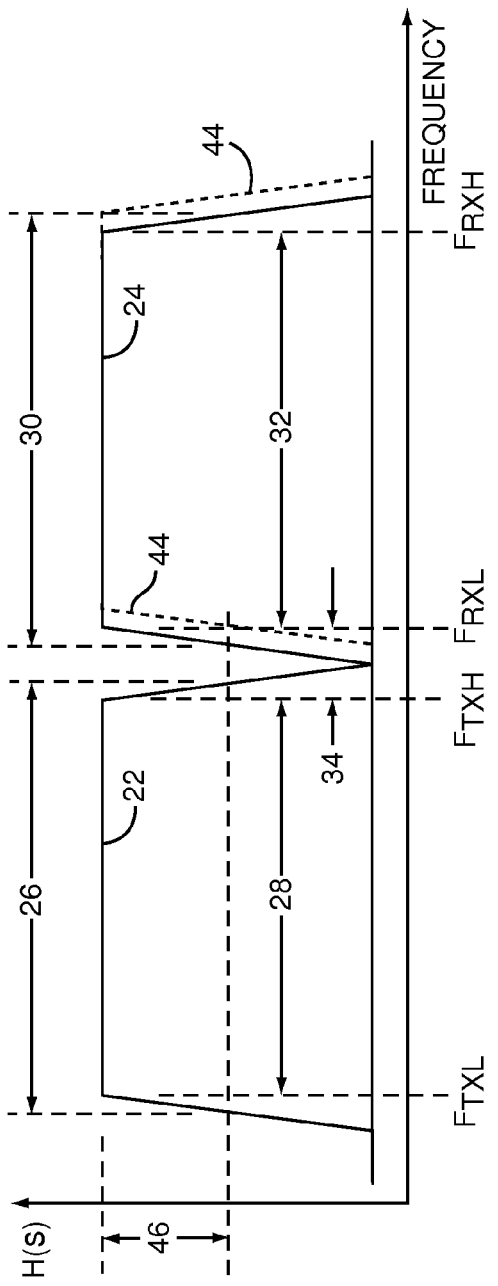

FIG. 4A is a graph showing the ideal transmit and receive bandpass filter response curves 22, 24 for an RF duplexer as illustrated in FIG. 2A. FIG. 4B is a graph showing an upward shifted receive bandpass filter response curve 44, which may be caused by manufacturing tolerances, temperature drift, aging, other factors, or any combination thereof. At the lowest receive passband frequency $F_{RXL}$, the receive bandpass filter 12 suffers additional insertion loss 46, which may degrade receiver sensitivity.

FIG. 5A is a graph showing the ideal transmit and receive bandpass filter response curves 22, 24 for an RF duplexer as illustrated in FIG. 2A. FIG. 5B is a graph showing a downward shifted receive bandpass filter response curve 48, which may be caused by manufacturing tolerances, temperature drift, aging, other factors, or any combination thereof. At the highest transmit passband frequency $F_{TXH}$, the receive bandpass filter 12 has degraded isolation 50, which may allow transmit signals to enter the receive path and degrade receiver sensitivity.

FIG. 6 shows a split band duplexer 52 according to one embodiment of the present invention. The split band duplexer 52 includes a first sub-band duplexer 54 and a second sub-band duplexer 56. The first sub-band duplexer 54 includes a first receive bandpass filter 58 and a first transmit bandpass filter 60, and the second sub-band duplexer 56 includes a second receive bandpass filter 62 and a second transmit bandpass filter 64. The first receive bandpass filter 58 provides a first filtered receive signal $RF_{FRX1}$ to a first low noise amplifier 66, which feeds RF receive circuitry 68.

The second receive bandpass filter 62 provides a second filtered receive signal $RF_{FRX2}$ to a second low noise amplifier 70, which feeds the RF receive circuitry 68. The first and second transmit bandpass filters 60, 64 are coupled to RF transmit circuitry 72 through transmit switching circuitry 74. The transmit switching circuitry 74 includes a first transmit switch 76 coupled between the RF transmit circuitry 72 and the first transmit bandpass filter 60, and a second transmit switch 78 coupled between the RF transmit circuitry 72 and the second transmit bandpass filter 64. The first transmit bandpass filter 60 receives a first transmit signal $RF_{TX1}$ from the first transmit switch 76, and the second transmit bandpass filter 64 receives a second transmit signal $RF_{TX2}$ from the second transmit switch 78. A power amplifier in the RF transmit circuitry 72 feeds both the first and second transmit switches 76, 78. Control circuitry 80 selects either the first transmit switch 76 or the second transmit switch 78 depending on which of the first and second sub-band duplexers 54, 56 is active.

The first receive and transmit bandpass filters 58, 60 are coupled to an antenna 82 through antenna switching circuitry 84, which uses a first antenna switch 86 to provide a selectable connection. The second receive and transmit bandpass filters 62, 64 are coupled to the antenna 82 through the antenna switching circuitry 84, which uses a second antenna switch 88 to provide a selectable connection. The antenna provides an antenna signal $RF_{ANT}$ to the first and second antenna switches 86, 88. The first receive bandpass filter 58 receives a first receive signal $RF_{RX1}$ from the first antenna switch 86, and the first transmit bandpass filter 60 provides a first filtered transmit signal $RF_{FTX1}$ to the first antenna switch 86. The second receive bandpass filter 62 receives a second receive signal $RF_{RX2}$ from the second antenna switch 88, and the second transmit bandpass filter 64 provides a second filtered transmit signal $RF_{FTX2}$ to the second antenna switch 88. The control circuitry 80 selects either the first antenna switch 86 or the second antenna switch 88 depending on which of the first and second sub-band duplexers 54, 56 is active.

In FIGS. 7B, 8B, 11B, and 12B, by selecting either the first or second sub-band duplexer 54, 56, the full frequency ranges spanned by the ideal transmit and receive bandpass filter response curves 22, 24 are provided. In one embodiment of the present invention, the split band duplexer 52 may support the UMTS Region 3 band; therefore, the lowest transmit passband frequency $F_{TXL}$ may be approximately equal to 1710 megahertz (MHz), the highest transmit passband frequency $F_{TXH}$ may be approximately equal to 1785 MHz, the lowest receive passband frequency $F_{RXL}$ may be approximately equal to 1805 MHz, and the highest receive passband frequency $F_{RXH}$ may be approximately equal to 1885 MHz. The split band duplexer 52 may support the UMTS Region 2 band; therefore, the lowest transmit passband frequency $F_{TXL}$ may be approximately equal to 1850 MHz, the highest transmit passband frequency $F_{TXH}$ may be approximately equal to 1910 MHz, the lowest receive passband frequency $F_{RXL}$ may be approximately equal to 1930 MHz, and the highest receive passband frequency $F_{RXH}$ may be approximately equal to 1990 MHz.

Figure 7A:
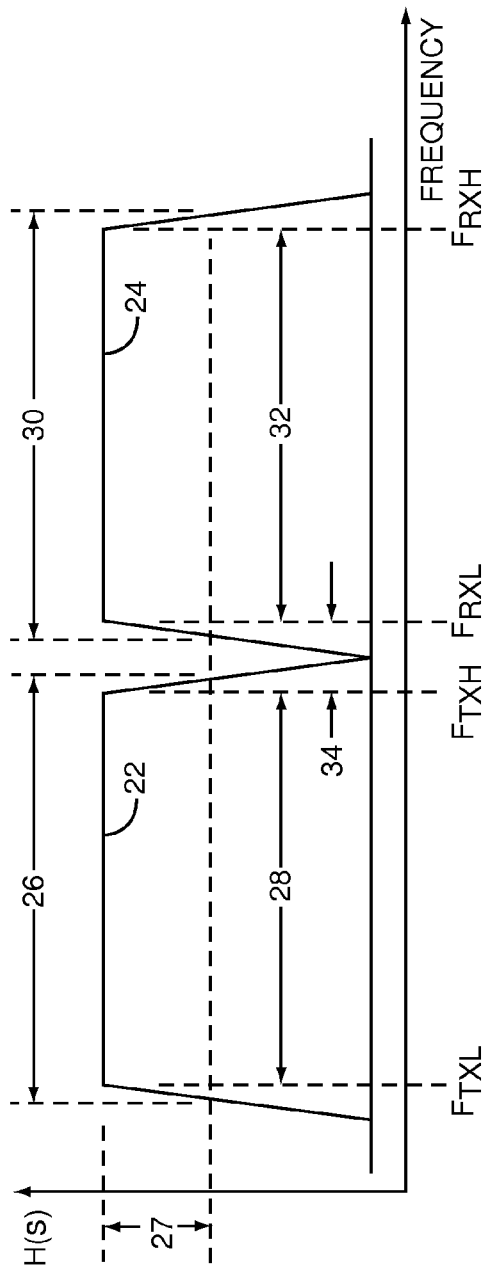
FIGS. 7A and 7B are graphs comparing the ideal transmit and receive bandpass filter response curves for an RF duplexer with a sub-band transmit bandpass filter response curve.
Figure 7B:
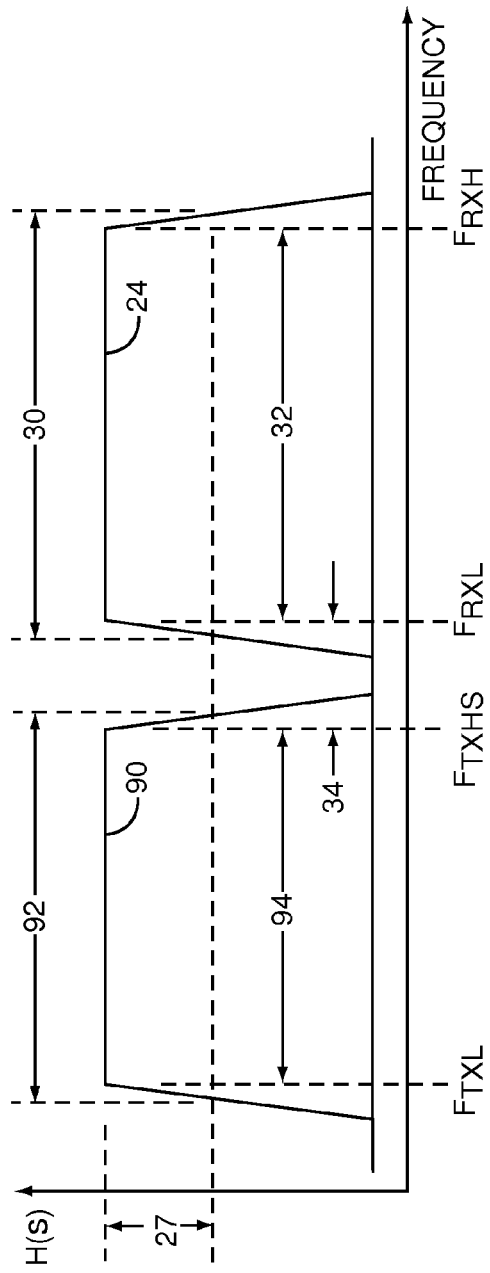

FIG. 7A is a graph showing the ideal transmit and receive bandpass filter response curves 22, 24 for an RF duplexer as illustrated in FIG. 2A. FIG. 7B is a graph showing a sub-band transmit bandpass filter response curve 90, which is provided by the first transmit bandpass filter 60. The first transmit bandpass filter 60 has a sub-transmit bandpass filter bandwidth 92 and a sub-transmit passband 94, which is narrower than the full transmit passband 28. The sub-transmit bandpass filter bandwidth 92 is measured at the filter breakpoint 27. The first receive bandpass filter 58 provides the full receive passband 32. By narrowing the sub-transmit passband 94, the guard band 34 is increased, thereby providing more isolation to accommodate filter shifting. The highest frequency in the transmit passband has now been lowered to a highest sub-transmit passband frequency $F_{TXHS}$.

FIG. 8A is a graph showing the ideal transmit and receive bandpass filter response curves 22, 24 for an RF duplexer as illustrated in FIG. 2A. FIG. 8B is a graph showing a sub-band receive bandpass filter response curve 96, which is provided by the second receive bandpass filter 62. The second receive bandpass filter 62 has a sub-receive bandpass filter bandwidth 98 and a sub-receive passband 100, which is less than the full receive passband 32. The sub-receive bandpass filter bandwidth 98 is measured at the filter breakpoint 27. The second transmit bandpass filter 64 provides the full transmit passband 28. By narrowing the receive passband, the guard band 34 is increased, thereby providing increased isolation to accommodate filter shifting. The lowest receive passband frequency is now increased to a lowest sub-receive passband frequency $F_{RXLS}$. By selecting either the first or second sub-band duplexer 54, 56, the full frequency ranges spanned by the ideal transmit and receive bandpass filter response curves 22, 24 are provided.

FIG. 9A is a graph showing the ideal transmit and receive bandpass filter response curves 22, 24 for an RF duplexer as illustrated in FIG. 2A. FIG. 9B is a graph showing a fixed duplex frequency 102. A duplex frequency is the difference between the frequency of a transmit signal and the frequency of a receive signal when both signals are present simultaneously. With a fixed duplex frequency 102, the duplex frequency does not change even though the frequencies of the receive and transmit signals may change. A frequency of a first transmit channel $F_{TXC1}$ is separated by a frequency of a first receive channel $F_{RXC1}$ by the fixed duplex frequency 102. Likewise, a frequency of a second transmit channel $F_{TXC2}$ is separated from a frequency of a second receive channel $F_{RXC2}$ by the fixed duplex frequency 102.

FIG. 10A is a graph showing the ideal transmit and receive bandpass filter response curves 22, 24 for an RF duplexer as illustrated in FIG. 2A. FIG. 10B is a graph showing a variable duplex frequency 104. With a variable duplex frequency 104, the difference between the frequency of a transmit signal and the frequency of a receive channel may change as the transmit and frequency signals change channels. The frequency of a first transmit channel $F_{TXC1}$ is separated by the frequency of a first receive channel $F_{RXC1}$ by the variable duplex frequency 104; however, the frequency of a second transmit channel $F_{TXC2}$ is separated by the frequency of a second receive channel $F_{RXC2}$ by the variable duplex frequency 104 having a different frequency value.

FIG. 11A is a graph showing the ideal transmit and receive bandpass filter response curves 22, 24 for an RF duplexer as illustrated in FIG. 2A. FIG. 11B is a graph showing a lower sub-band transmit bandpass filter response curve 106 and a lower sub-band receive bandpass filter response curve 108. The lower sub-band transmit bandpass filter response curve 106 is provided by the first transmit bandpass filter 60 that has a lower sub-band transmit bandwidth 110 and a lower sub-band transmit passband 112, which is narrower than the full transmit passband 28. The lower sub-band transmit bandwidth 110 is measured at the filter breakpoint 27. The lower sub-band receive bandpass filter response curve 108 is provided by the first receive bandpass filter 58 that has a lower sub-band receive bandwidth 114 and a lower sub-band receive passband 116, which is lower than the full receive passband 32. The lower sub-band receive bandwidth 114 is measured at the filter breakpoint 27. The lower sub-band transmit passband 112 spans from the lowest transmit passband frequency $F_{TXL}$ to a highest lower sub-band transmit frequency $F_{TXHL}$. The lower sub-band receive passband 116 spans from a lowest lower sub-band receive frequency $F_{RXLL}$ to a highest lower sub-band receive frequency $F_{RXHL}$.

Figure 12A:
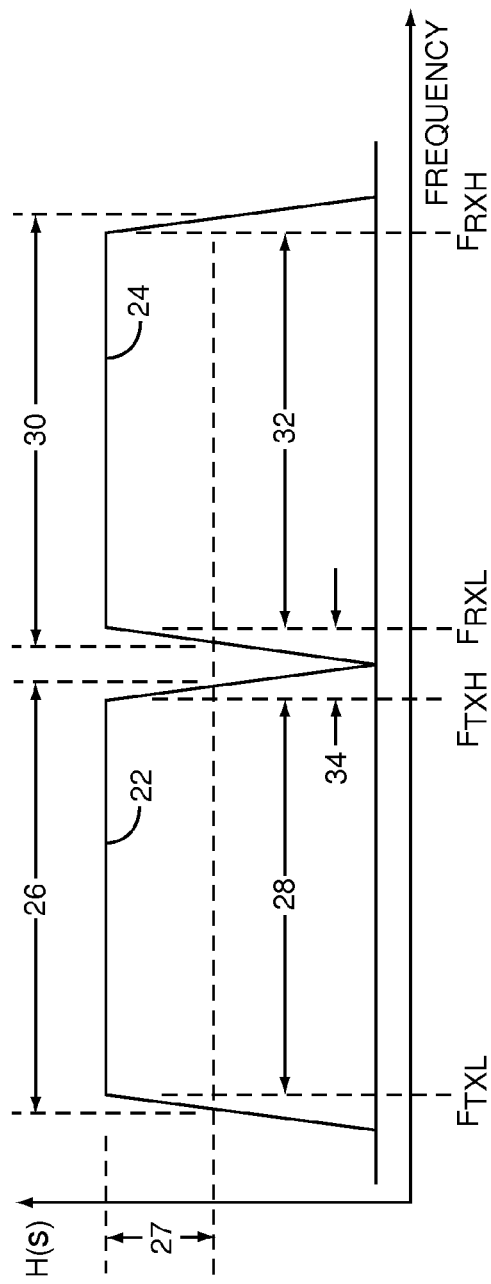
FIGS. 12A and 12B are graphs comparing the ideal transmit and receive bandpass filter response curves for an RF duplexer with a higher sub-band transmit bandpass filter response curve and a higher sub-band receive bandpass filter response curve.
Figure 12B:
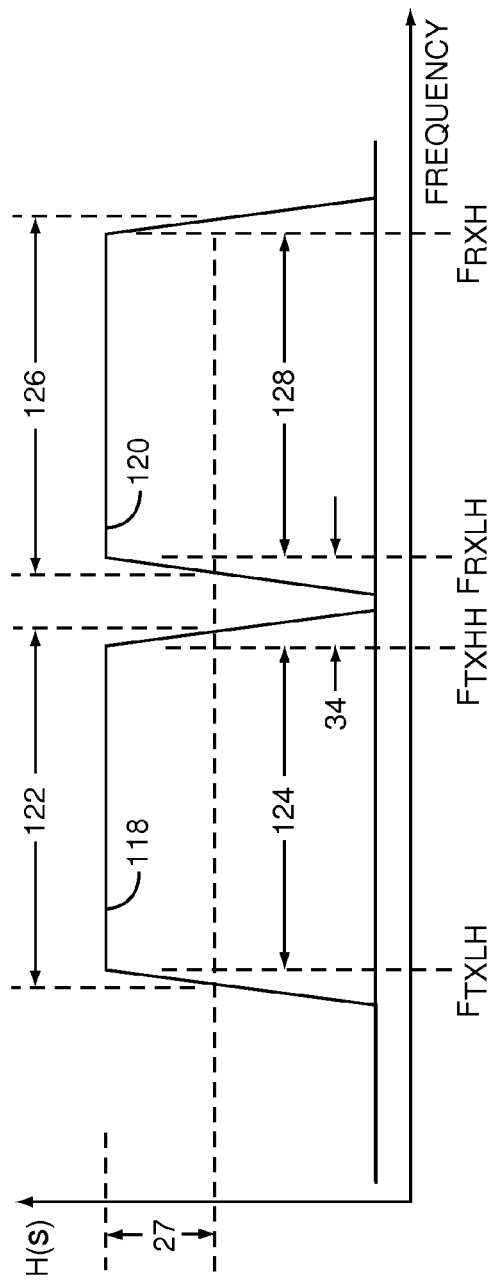

FIG. 12A is a graph showing the ideal transmit and receive bandpass filter response curves 22, 24 for an RF duplexer as illustrated in FIG. 2A. FIG. 12B is a graph showing a higher sub-band transmit bandpass filter response curve 118 and a higher sub-band receive bandpass filter response curve 120. The higher sub-band transmit bandpass filter response curve 118 is provided by the second transmit bandpass filter 64 that has a higher sub-band transmit bandwidth 122 and a higher sub-band transmit passband 124, which is narrower than the full transmit passband 28. The higher sub-band transmit bandwidth 122 is measured at the filter breakpoint 27. The higher sub-band receive bandpass filter response curve 120 is provided by the second receive bandpass filter 62 that has a higher sub-band receive bandwidth 126 and a higher sub-band receive passband 128, which is narrower than the full receive passband 32. The higher sub-band receive bandwidth 126 is measured at the filter breakpoint 27. The higher sub-band transmit passband 124 spans from a lowest higher sub-band transmit frequency $F_{TXLH}$ to a highest higher sub-band transmit frequency $F_{TXHH}$. The higher sub-band receive passband 128 spans from a lowest higher sub-band receive frequency $F_{RXLH}$ to the highest receive passband frequency $F_{RXH}$. By selecting either the first or second sub-band duplexer 54, 56, the full frequency ranges spanned by the ideal transmit and receive bandpass filter response curves 22, 24 are provided.

FIG. 13 adds a first matching network 130 and a second matching network 132 to the first and second sub-band duplexers 54, 56, respectively, illustrated in FIG. 6. The first matching network 130 is coupled between the antenna side of the first receive bandpass filter 58 and the first transmit bandpass filter 60. The second matching network 132 is coupled between the antenna side of the second receive bandpass filter 62 and the second transmit bandpass filter 64. The first and second matching networks 130, 132 may be used to isolate impedance anomalies outside the passbands of the first and second receive bandpass filters 58, 62. Such anomalies may be present when using SAW filters. The first and second matching networks 130, 132 may include one-quarter wavelength transmission lines at transmit frequencies to provide the isolation.

FIG. 14 shows the antenna 82 and antenna switching circuitry 84 illustrated in FIG. 6 replaced with a first antenna 134 and a second antenna 136 according to an alternate embodiment of the present invention. The first antenna 134 has a first antenna signal $RF_{ANT1}$, and is coupled to the first sub-band duplexer 54. The second antenna 136 has a second antenna signal $RF_{ANT2}$, and is coupled to the second sub-band duplexer 56. The first and second antennas 134, 136 may provide spatial diversity.

FIG. 15 shows the transmit switching circuitry 74 illustrated in FIG. 14 replaced with a first power amplifier 138 and a second power amplifier 140 according to an additional embodiment of the present invention. The RF transmit circuitry 72 feeds the first power amplifier 138, which feeds the first transmit bandpass filter 60. The RF transmit circuitry 72 feeds the second power amplifier 140, which feeds the second transmit bandpass filter 64.

FIG. 16 shows the antenna 82 and antenna switching circuitry 84 illustrated in FIG. 6 replaced with a first receive antenna 142, a first transmit antenna 144, a second receive antenna 146, and a second transmit antenna 148, according to another embodiment of the present invention. The first receive antenna 142 has a first receive antenna signal $RF_{RANT1}$, and is coupled to the first receive bandpass filter 58. The first transmit antenna 144 has a first transmit antenna signal $RF_{TANT1}$, and is coupled to the first transmit bandpass filter 60. The second receive antenna 146 has a second receive antenna signal $RF_{RANT2}$, and is coupled to the second receive bandpass filter 62. The second transmit antenna 148 has a second transmit antenna signal $RF_{TANT2}$, and is coupled to the second transmit bandpass filter 64.

An application example of an RF duplexer 150 is its use in a mobile terminal 152, the basic architecture of which is represented in FIG. 17. The mobile terminal 152 may include a receiver front end 154, a radio frequency transmitter section 156, an antenna 158, the RF duplexer 150, a baseband processor 160, a control system 162, a frequency synthesizer 164, and an interface 166. The receiver front end 154 receives information bearing radio frequency signals from one or more remote transmitters provided by a base station. A low noise amplifier (LNA) 168 amplifies the signal. A filter circuit 170 minimizes broadband interference in the received signal, while down conversion and digitization circuitry 172 down converts the filtered, received signal to an intermediate or baseband frequency signal, which is then digitized into one or more digital streams. The receiver front end 154 typically uses one or more mixing frequencies generated by the frequency synthesizer 164. The baseband processor 160 processes the digitized received signal to extract the information or data bits conveyed in the received signal. This processing typically comprises demodulation, decoding, and error correction operations. As such, the baseband processor 160 is generally implemented in one or more digital signal processors (DSPs).

On the transmit side, the baseband processor 160 receives digitized data, which may represent voice, data, or control information, from the control system 162, which it encodes for transmission. The encoded data is output to the transmitter 156, where it is used by a modulator 174 to modulate a carrier signal that is at a desired transmit frequency. Power amplifier circuitry 176 amplifies the modulated carrier signal to a level appropriate for transmission, and delivers the amplified and modulated carrier signal to the antenna 158 through the duplexer 150.

A user may interact with the mobile terminal 152 via the interface 166, which may include interface circuitry 178 associated with a microphone 180, a speaker 182, a keypad 184, and a display 186. The interface circuitry 178 typically includes analog-to-digital converters, digital-to-analog converters, amplifiers, and the like. Additionally, it may include a voice encoder/decoder, in which case it may communicate directly with the baseband processor 160. The microphone 180 will typically convert audio input, such as the user's voice, into an electrical signal, which is then digitized and passed directly or indirectly to the baseband processor 160. Audio information encoded in the received signal is recovered by the baseband processor 160, and converted by the interface circuitry 178 into an analog signal suitable for driving the speaker 182. The keypad 184 and display 186 enable the user to interact with the mobile terminal 152, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. Radio frequency (RF) circuitry comprising:
   a first sub-band duplexer adapted to:
      receive and filter a first transmit signal using a first transmit bandpass filter having a first transmit bandwidth and a first transmit passband center frequency to provide a first filtered transmit signal; and
      receive and filter a first receive signal using a first receive bandpass filter having a first receive bandwidth and a first receive passband center frequency to provide a first filtered receive signal, such that the first receive bandwidth is less than the first transmit bandwidth;
   a second sub-band duplexer adapted to:
      receive and filter a second transmit signal using a second transmit bandpass filter having a second transmit bandwidth and a second transmit passband center frequency to provide a second filtered transmit signal, such that the second transmit bandwidth is less than the first transmit bandwidth; and
      receive and filter a second receive signal using a second receive bandpass filter having a second receive bandwidth and a second receive passband center frequency to provide a second filtered receive signal, such that the first receive bandwidth is less than the second receive bandwidth and the second transmit bandwidth is less than the second receive bandwidth;
   a first amplifier adapted to receive and amplify the first filtered receive signal to provide a first amplified filtered receive signal; and
   a second amplifier adapted to receive and amplify the second filtered receive signal to provide a second amplified filtered receive signal,
   wherein the first transmit bandwidth at a transmit filter breakpoint does not overlap the first receive bandwidth at a receive filter breakpoint, and the second transmit bandwidth at the transmit filter breakpoint does not overlap the second receive bandwidth at the receive filter breakpoint.

2. The RF circuitry of claim 1 wherein the first amplifier comprises a first low noise amplifier, and the second amplifier comprises a second low noise amplifier.

3. The RF circuitry of claim 1 wherein:
the first receive passband center frequency is greater than the second receive passband center frequency; and
the first transmit passband center frequency is greater than the second transmit passband center frequency.

4. The RF circuitry of claim 1 wherein:
the first receive passband center frequency is greater than the first transmit passband center frequency; and
the second receive passband center frequency is greater than the second transmit passband center frequency.

5. The RF circuitry of claim 4 wherein:
the passbands of the first and second transmit bandpass filters span a frequency range from approximately 1710 megahertz to approximately 1785 megahertz; and
the passbands of the first and second receive bandpass filters span a frequency range from approximately 1805 megahertz to approximately 1885 megahertz.

6. The RF circuitry of claim 4 wherein:
the passbands of the first and second transmit bandpass filters span a frequency range from approximately 1850 megahertz to approximately 1910 megahertz; and
the passbands of the first and second receive bandpass filters span a frequency range from approximately 1930 megahertz to approximately 1990 megahertz.

7. The RF circuitry of claim 1 further comprising a duplex frequency, wherein the duplex frequency remains approximately unchanged during a first full duplex mode of operation.

8. The RF circuitry of claim 1 further comprising a first power amplifier adapted to provide the first transmit signal, and a second power amplifier adapted to provide the second transmit signal.

9. The RF circuitry of claim 1 further comprising a power amplifier adapted to provide a common transmit signal to switching circuitry, and the switching circuitry adapted to provide the first transmit signal and the second transmit signal based on the common transmit signal and a switch select signal.

10. The RF circuitry of claim 9 wherein the switching circuitry comprises at least one Micro-Electro-Mechanical Systems (MEMS) switch.

11. The RF circuitry of claim 1 wherein at least one of the first transmit bandpass filter, the second transmit bandpass filter, the first receive bandpass filter, and the second receive bandpass filter, comprises a surface acoustic wave (SAW) filter.

12. The RF circuitry of claim 11 wherein the SAW filter comprises lithium tantalate.

13. The RF circuitry of claim 1 further comprising an antenna adapted to provide the first and second receive signals, and receive the first and second filtered transmit signals.

14. The RF circuitry of claim 13 further comprising switching circuitry coupled to the antenna, and adapted to provide the first and second receive signals, and receive the first and second filtered transmit signals.

15. The RF circuitry of claim 14 wherein the switching circuitry comprises at least one Micro-Electro-Mechanical Systems (MEMS) switch.

16. The RF circuitry of claim 15 further comprising;
a substrate comprising the at least one MEMS switch; and
a semiconductor die comprising the first and second amplifiers, wherein the semiconductor die is mounted to the substrate.

17. The RF circuitry of claim 14 wherein the switching circuitry comprises at least one of a group consisting of complementary metal oxide semiconductor switches, p-type high electron mobility transistor switches, silicon germanium switches, and discrete mechanical switches.

18. The RF circuitry of claim 1 further comprising:
a first antenna adapted to provide the first receive signal and receive the first filtered transmit signal; and
a second antenna adapted to provide the second receive signal and receive the second filtered transmit signal.

19. The RF circuitry of claim 1 further comprising:
a first antenna adapted to provide the first receive signal;
a second antenna adapted to provide the second receive signal;
a third antenna adapted to receive the first filtered transmit signal; and
a fourth antenna adapted to receive the second filtered transmit signal.

20. The RF circuitry of claim 1 further comprising a duplex frequency, wherein the duplex frequency is variable during a first full duplex mode of operation.

21. Radio frequency (RF) circuitry comprising:
a first sub-band duplexer adapted to:
receive and filter a first transmit signal using a first transmit bandpass filter having a first transmit bandwidth and a first transmit passband center frequency to provide a first filtered transmit signal; and
receive and filter a first receive signal using a first receive bandpass filter having a first receive bandwidth and a first receive passband center frequency to provide a first filtered receive signal;
a second sub-band duplexer adapted to:
receive and filter a second transmit signal using a second transmit bandpass filter having a second transmit bandwidth and a second transmit passband center frequency to provide a second filtered transmit signal; and
receive and filter a second receive signal using a second receive bandpass filter having a second receive bandwidth and a second receive passband center frequency to provide a second filtered receive signal, such that the first receive bandwidth, the second receive bandwidth, the first transmit bandwidth, and the second transmit bandwidth are approximately equal;
a first amplifier adapted to receive and amplify the first filtered receive signal to provide a first amplified filtered receive signal; and
a second amplifier adapted to receive and amplify the second filtered receive signal to provide a second amplified filtered receive signal,
wherein the first transmit bandwidth at a transmit filter breakpoint does not overlap the first receive bandwidth at a receive filter breakpoint, and the second transmit bandwidth at the transmit filter breakpoint does not overlap the second receive bandwidth at the receive filter breakpoint.

22. The RF circuitry of claim 21 wherein:
the first receive passband center frequency is less than the second receive passband center frequency; and
the first transmit passband center frequency is less than the second transmit passband center frequency.

23. The RF circuitry of claim 21 further comprising a duplex frequency, wherein the duplex frequency is variable during a first full duplex mode of operation.

24. Radio frequency (RF) circuitry comprising:
a first sub-band duplexer adapted to:

receive and filter a first transmit signal using a first transmit bandpass filter having a first transmit bandwidth and a first transmit passband center frequency to provide a first filtered transmit signal; and receive and filter a first receive signal using a first receive bandpass filter having a first receive bandwidth and a first receive passband center frequency to provide a first filtered receive signal;

a second sub-band duplexer adapted to:

receive and filter a second transmit signal using a second transmit bandpass filter having a second transmit bandwidth and a second transmit passband center frequency to provide a second filtered transmit signal; and receive and filter a second receive signal using a second receive bandpass filter having a second receive bandwidth and a second receive passband center frequency to provide a second filtered receive signal;

a first amplifier adapted to receive and amplify the first filtered receive signal to provide a first amplified filtered receive signal;

a second amplifier adapted to receive and amplify the second filtered receive signal to provide a second amplified filtered receive signal; and a duplex frequency, wherein the duplex frequency is variable during a first full duplex mode of operations, wherein the first transmit bandwidth at a transmit filter breakpoint does not overlap the first receive bandwidth at a receive filter breakpoint, and the second transmit bandwidth at the transmit filter breakpoint does not overlap the second receive bandwidth at the receive filter breakpoint.

* * * * *